United States Patent
Heo et al.

(10) Patent No.: US 11,356,225 B2
(45) Date of Patent: *Jun. 7, 2022

(54) METHOD AND APPARATUS FOR TRANSMITTING/RECEIVING DATA AND CONTROL INFORMATION THROUGH AN UPLINK IN A WIRELESS COMMUNICATION SYSTEM

(71) Applicant: Huawei Technologies Co., Ltd., Shenzhen (CN)

(72) Inventors: Youn-Hyoung Heo, Gyeonggi-do (KR); Ju-Ho Lee, Gyeonggi-do (KR); Joon-Young Cho, Gyeonggi-do (KR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,253

(22) Filed: Apr. 29, 2020

(65) Prior Publication Data

US 2020/0259624 A1 Aug. 13, 2020

Related U.S. Application Data

(63) Continuation of application No. 14/564,965, filed on Dec. 9, 2014, now Pat. No. 10,756,872, which is a (Continued)

(30) Foreign Application Priority Data

| Dec. 18, 2006 | (KR) | 10-2006-0129696 |
| Mar. 20, 2007 | (KR) | 10-2007-0027208 |
| Jun. 19, 2007 | (KR) | 10-2007-0059908 |

(51) Int. Cl.
*H04L 5/00* (2006.01)
*H04L 1/00* (2006.01)
*H04L 27/26* (2006.01)

(52) U.S. Cl.
CPC ............ *H04L 5/0055* (2013.01); *H04L 1/001* (2013.01); *H04L 1/0004* (2013.01);
(Continued)

(58) Field of Classification Search
None
See application file for complete search history.

(56) References Cited

U.S. PATENT DOCUMENTS

| 7,492,699 B2 | 2/2009 | Cho |
| 8,325,593 B2 | 12/2012 | Kawamura et al. |

(Continued)

FOREIGN PATENT DOCUMENTS

| CN | 1533049 A | 9/2004 |
| CN | 1627677 A | 6/2005 |

(Continued)

OTHER PUBLICATIONS

"3rd Generation Partnership Project; Technical Specification Group Radio Access Network; Physical Channels and Modulation (Release 8)," 3GPP TS 36.211 V0.2.0, total 22 pages, 3rd Generation Partnership Project, Valbonne, France (Nov. 2006).

(Continued)

*Primary Examiner* — Jay L Vogel
(74) *Attorney, Agent, or Firm* — Leydig, Voit & Mayer, Ltd.

(57) ABSTRACT

Disclosed is a method and an apparatus for multiplexing and transmitting data and uplink control information, and receiving the data and control information in a wireless communication system. In the system multiplexing an uplink packet data channel and a control channel, a transport format of the control channel for transmission of the control information is changed according to the transport format of the data channel. The disclosed method and apparatus can control the quantity of resources for the control channel in the case of (Continued)

transmitting high speed data, and thus can the efficiency of the data channel resources.

12 Claims, 15 Drawing Sheets

Related U.S. Application Data continuation of application No. 14/292,146, filed on May 30, 2014, now Pat. No. 8,909,137, which is a continuation of application No. 11/958,709, filed on Dec. 18, 2007, now Pat. No. 8,954,105.

(52) U.S. Cl.
CPC .......... *H04L 1/0079* (2013.01); *H04L 5/0044* (2013.01); *H04L 5/0053* (2013.01); *H04L 5/0064* (2013.01); *H04L 27/2636* (2013.01)

(56) References Cited

U.S. PATENT DOCUMENTS

| | | | |
|---|---|---|---|
| 10,756,872 B2* | 8/2020 | Heo | H04L 1/0004 |
| 2002/0082020 A1* | 6/2002 | Lee | H04W 72/1289 |
| | | | 455/450 |
| 2003/0220122 A1 | 11/2003 | Lim et al. | |
| 2004/0014482 A1 | 1/2004 | Kwak et al. | |
| 2004/0165684 A1 | 8/2004 | Ketchum et al. | |
| 2004/0229641 A1 | 11/2004 | Takagi | |
| 2005/0094615 A1 | 5/2005 | Kim et al. | |
| 2005/0105640 A1 | 5/2005 | Han et al. | |
| 2005/0163071 A1 | 7/2005 | Malladi et al. | |
| 2006/0018413 A1* | 1/2006 | Gupta | H04L 27/2665 |
| | | | 375/343 |
| 2006/0133522 A1* | 6/2006 | Sutivong | H04B 1/713 |
| | | | 375/260 |
| 2006/0153060 A1 | 7/2006 | Cho | |
| 2006/0212133 A1* | 9/2006 | Damnjanovic | H04W 16/12 |
| | | | 700/1 |
| 2006/0227888 A1* | 10/2006 | Khan | H04L 27/2614 |
| | | | 375/260 |
| 2006/0250941 A1 | 11/2006 | Onggosanusi et al. | |
| 2006/0268837 A1* | 11/2006 | Larsson | H04L 1/0083 |
| | | | 370/352 |
| 2007/0054691 A1* | 3/2007 | Sankar | H04W 52/56 |
| | | | 455/522 |
| 2008/0014891 A1 | 1/2008 | Jin et al. | |
| 2008/0095110 A1* | 4/2008 | Montojo | H04L 5/0017 |
| | | | 370/330 |
| 2008/0101326 A1 | 5/2008 | Zhang et al. | |
| 2009/0161789 A1* | 6/2009 | Imamura | H04L 1/0042 |
| | | | 375/295 |
| 2010/0027450 A1 | 2/2010 | Montojo et al. | |
| 2010/0309857 A1 | 12/2010 | Kawamura et al. | |

FOREIGN PATENT DOCUMENTS

| | | |
|---|---|---|
| EP | 1720310 A2 | 11/2006 |
| JP | 2010503334 A | 1/2010 |
| JP | 2010508778 A | 3/2010 |
| KR | 1020040072817 A | 8/2004 |
| RU | 2242089 C2 | 12/2004 |
| RU | 2258311 C2 | 8/2005 |
| WO | 9901994 A2 | 1/1999 |
| WO | 0239595 A2 | 5/2002 |
| WO | 2005034567 A1 | 4/2005 |
| WO | 2009020983 A1 | 2/2009 |

OTHER PUBLICATIONS

"3rd Generation Partnership Project; Technical Specification Group Radio Access Network; Multiplexing and channel coding (Release 8)," 3GPP TS 36.212 V0.2.0, total 9 pages, 3rd Generation Partnership Project, Valbonne, France (Nov. 2006).
"Indication of combination between L1/L2 control signaling and uplink data," TSG-RAN WG1 Meeting#44bis, Athens, Greece, R1-060793, pp. 1-3, 3rd Generation Partnership Project, Valbonne, France (Mar. 27-31, 2006).
"Summary of e-mail discussions on control signaling," TSG-RAN WG1 #46bis, Seoul, Korea, R1-062874, pp. 1-2, 3rd Generation Partnership Project, Valbonne, France (Oct. 9-13, 2006).
Lucent Technologies, "Multiplexing Method for Uplink Non-Data-Associated Control Signals," 3GPP TSG-RAN WG1 #47, R1-063483 (Nov. 10, 2006).
Nokia, "TDM Based Multiplexing Schemes Between L1/L2 Control and UL Data," 3GPP TSG RAN WG1 #46bis, R1-062840 (Oct. 13, 2006).
ZTE, "Non-Data-Associated Control Signaling," R1-063191, 3GPP TSG-RAN WG1 #47 (Nov. 6, 2006).
NTT DoCoMo et al., "L1/L2 Control Channel Structure for E-UTRA Uplink," R1-061183, 3GPP TSG RAN WG1 Meeting #45 (May 2, 2006).
U.S. Appl. No. 14/292,146, filed May 30, 2014.
U.S. Appl. No. 11/958,709, filed Dec. 18, 2007.

\* cited by examiner

METHOD AND APPARATUS FOR TRANSMITTING/RECEIVING DATA AND CONTROL INFORMATION THROUGH AN UPLINK IN A WIRELESS COMMUNICATION SYSTEM

CROSS-REFERENCE TO RELATED APPLICATIONS

This application is a continuation of U.S. patent application Ser. No. 14/564,965, filed on Dec. 9, 2014, which is a continuation of U.S. patent application Ser. No. 14/292,146, filed on May 30, 2014, now U.S. Pat. No. 8,909,137, which a continuation of U.S. patent application Ser. No. 11/958,709, filed on Dec. 18, 2007, now U.S. Pat. No. 8,954,105. The International Application claims priority to Korea, Republic of (KR) Patent Application No. KR10-2007-0059908, filed on Jun. 19, 2007 and Korea, Republic of (KR) Patent Application No. KR10-2006-0129696, filed on Dec. 18, 2006 and Korea, Republic of (KR) Patent Application No. KR10-2007-0027208, filed on Mar. 20, 2007. All of the afore-mentioned patent applications are hereby incorporated by reference in their entireties.

BACKGROUND OF THE INVENTION

1. Field of the Invention

The present disclosure relates to a wireless communication system, and more particularly to a method and an apparatus for transmitting a data channel and a control channel in the same transmission time interval.

2. Description of the Related Art

In general, transmission schemes employed in a Single Carrier-Frequency Division Multiple Access (SC-FDMA) system, which is an example of a wireless communication system, includes a Distributed FDMA (DFDMA) scheme and a Localized FDMA (LFDMA) scheme.

FIG. 1 is a block diagram illustrating a structure of a transmitter in a typical LFDMA system. It is possible to implement another type of transmitter as well as the transmitter shown in FIG. 1, which includes a Discrete Fourier Transform (DFT) precoder 101 and an Inverse Fast Fourier Transform (IFFT) unit 102. Implementation of the DFT precoder 101 and the IFFT unit 102 as shown in FIG. 1 facilitates changes of the LFDMA system parameters without a high hardware complexity.

A difference between the OFDM and the SC-FDMA is discussed in view of the transmitter structure. Further to the IFFT unit 102, which is used for multi-carrier transmission in a typical OFDM transmitter, the LFDMA transmitter additionally includes the DFT precoder 101 connected to the input side of the IFFT unit 102. M number of sub-carriers output from the DFT precoder 101 are mapped to the input points N−M to N−1 of the IFFT unit 102, so that they occupy and are transmitted by a band configured by adjacent sub-carriers. In general, the input/output size N of the IFFT unit 102 has a value greater than the input/output size M of the DFT precoder 101. The output signal of the IFFT unit 102 is transmitted after passing through the Parallel-to-Serial (P/A) converter 104 and the Cyclic Prefix (CP) adder 106.

In an uplink transmission, control information that should be transmitted through a control channel by a User Equipment (UE) includes Acknowledge/Non-Acknowledge (ACK/NACK) or Channel Quality Indicator (CQI) that is necessary mainly for the transmission of downlink packet data.

FIGS. 2A and 2B illustrate transmission of control information in a typical SC-FDMA system.

Referring to FIG. 2A, a separate frequency resource 201 different from that of the data channel is allocated to a control channel in order to transmit control information in an SC-FDMA system. In the case of transmitting control information through the allocated frequency resource 201, a UE cannot transmit packet data. This is because simultaneous transmission of packet data and control information in the same transmission interval cannot satisfy the single carrier characteristic, which results in an increase in the Peak to Average Ratio (PAPR).

Therefore, when it is necessary to transmit control information in a transmission interval for packet data transmission by a UE, the control information is transmitted together with data through the frequency resource 203 of the data channel as shown in FIG. 2B. In other words, packet data, control information, and a reference signal are time-multiplexed and transmitted in the same frequency resource 203.

FIG. 3 is a block diagram illustrating a structure of a transmitter for multiplexing and transmitting packet data and control information before input of them to a DFT precoder in a typical SC-FDMA system. As shown, data 301 including P number of symbols and control information 302 including S number of symbols are multiplexed into M symbols by a multiplexer 303, which are then input to a DFT precoder 304 having a size of M. As described above, outputs of the DFT precoder 304 are mapped to inputs of an IFFT 305 having a size of N.

When the packet data and the control information are multiplexed before the DFT precoder as shown in FIG. 3, it is necessary to allocate the scheduled M input symbols based on the information quantity of each of the data channel and the control channel. According to one typical scheme, such as the Wideband Code Division Multiple Access (WCDMA) scheme, input symbols are allocated in accordance with the set transport format of each of the control channel and the data channel. In other words, when the number of symbols is set according to a fixed transport format of the control channel, the other input symbols except for the symbols of the control channel are used for data transmission. This is because it is usual that a data rate of a data channel is variable according to the scheduling while the transport format of the control channel is fixedly set by higher layer signaling.

However, when the transport format of the control channel is fixed as described above, as many symbols as the symbols occupied by the control channel are reduced from the symbols transmissible through the packet data channel, so as to reduce the data rate. At this time, the data rate is reduced by the amount corresponding to (the number of symbols used for the control channel×a Modulation and Coding Scheme (MCS) level). Therefore, when a UE has obtained a high MCS level scheduled for high speed data transmission, the number of data bits that are not transmitted may increase due to the transmission of the control information.

SUMMARY OF THE INVENTION

Accordingly, the present disclosure has been made to solve the above-mentioned problems occurring in the prior art, and the present disclosure provides a method and an apparatus for controlling the quantity of resources used in a control channel according to the data rate of a UE in a wireless communication system.

Also, the present disclosure provides a method and an apparatus for controlling the quantity of resources of a control channel according to a transport format to be used based on a scheduling data rate or a data rate to be used by a UE.

Also, the present disclosure provides a method and an apparatus for transmitting control information by using the same modulation scheme as a modulation scheme to be used for data transmission by a UE.

Also, the present disclosure provides a method and an apparatus for calculating the number of modulation symbols necessary for the transmission of control information according to a transport format of a data channel.

Also, the present disclosure provides a method and an apparatus of a UE for multiplexing and transmitting a data channel and a control channel in an SC-FDMA system.

Also, the present disclosure provides a method and an apparatus of a Node B for receiving multiplexed data channel and control channel in an SC-FDMA system.

In accordance with an aspect of the present disclosure, there is provided a method for transmitting data and control information in a wireless communication system, the method includes determining a control channel format given by a transport format used for a data channel; generating data according to the transport format of the data channel; generating control information according to the determined control channel format; multiplexing the data and the control information and transmitting the multiplexed data and control information; through sub-carrier resources allocated for the data channel.

In accordance with another aspect of the present disclosure, there is provided a user equipment (UE) apparatus for transmitting data and control information in a wireless communication system, the UE apparatus includes a controller for determining a control channel format given by a transport format used for a data channel; a data generator for generating data according to the transport format of the data channel; a control information generator for generating control information according to the determined control channel format; and a transmission unit for multiplexing the data and the control information and transmitting the multiplexed data and control information through sub-carrier resources allocated for the data channel.

In accordance with another aspect of the present disclosure, there is method provided for receiving data and control information in a wireless communication system, the method includes receiving an uplink signal including data and control information through sub-carrier resources allocated for a data channel; determining a control channel format given by a transport format used for the data channel; and de-multiplexing the uplink signal according to the control channel format and the transport format of the data channel in order to acquire the data and the control information.

In accordance with another aspect of the present disclosure, there is provided a Node B apparatus for receiving data and control information in a wireless communication system, the Node B apparatus includes a receiving unit for receiving an uplink signal including data and control information through sub-carrier resources allocated for a data channel; a controller for determining a control channel format given by a transport format used for the data channel; and a de-multiplexer for de-multiplexing the uplink signal according to the control channel format and the transport format of the data channel in order to acquire the data and the control information.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENT

Figure 1:
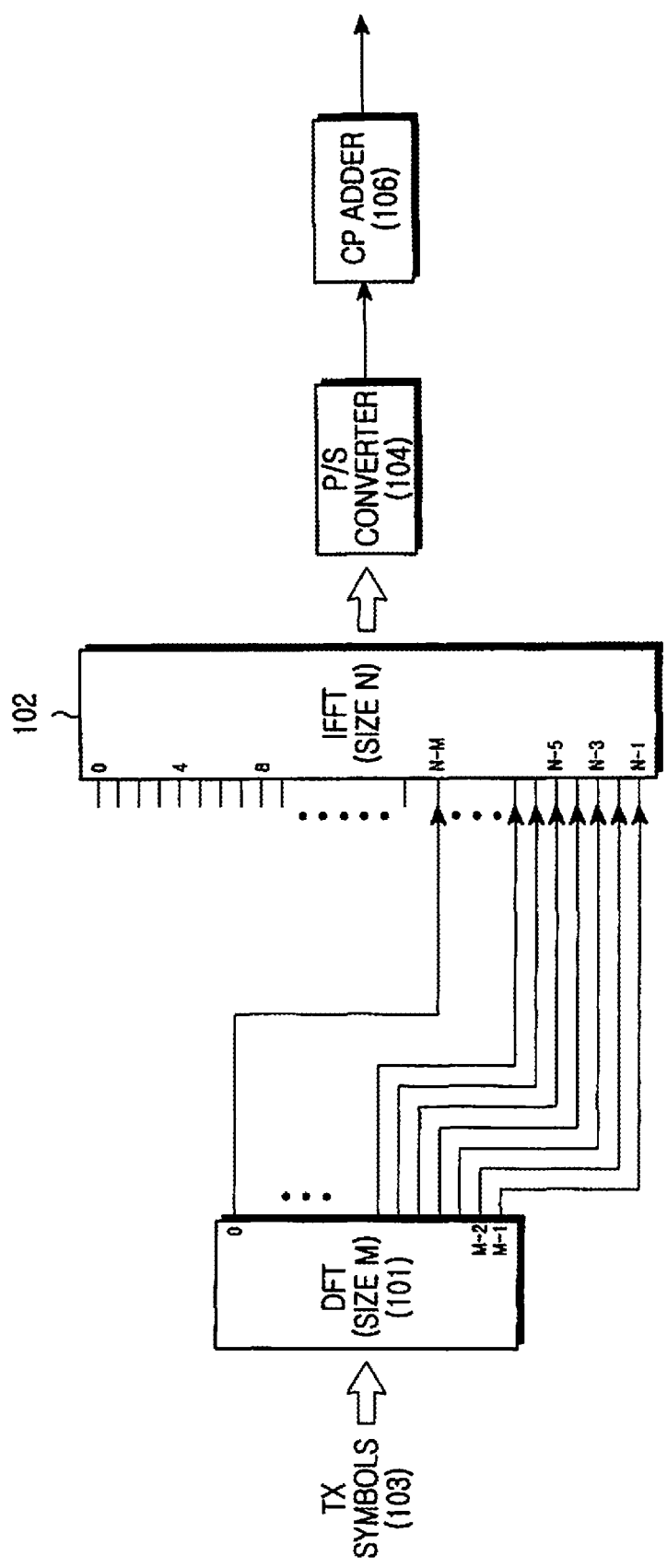
FIG. 1 is a block diagram illustrating a structure of a transmitter in a typical LFDMA system.
Figure 2A:
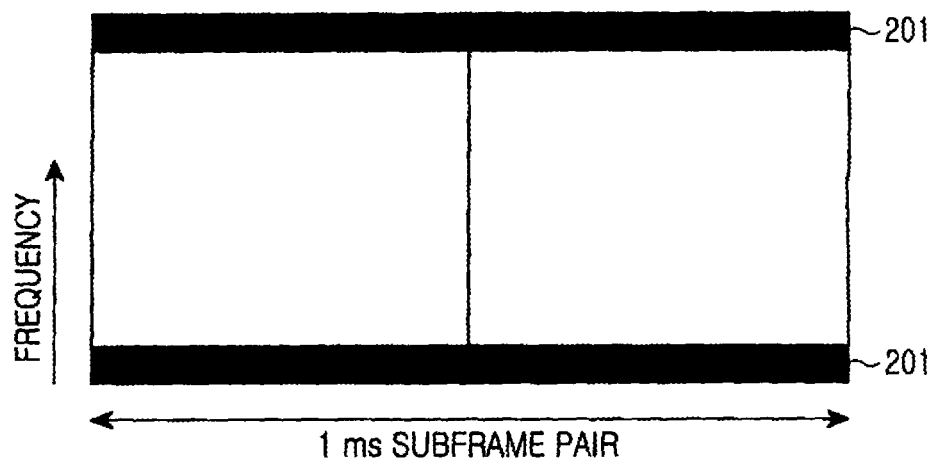
FIGS. 2A and 2B illustrate transmission of control information in a typical SC-FDMA system.
Figure 2B:
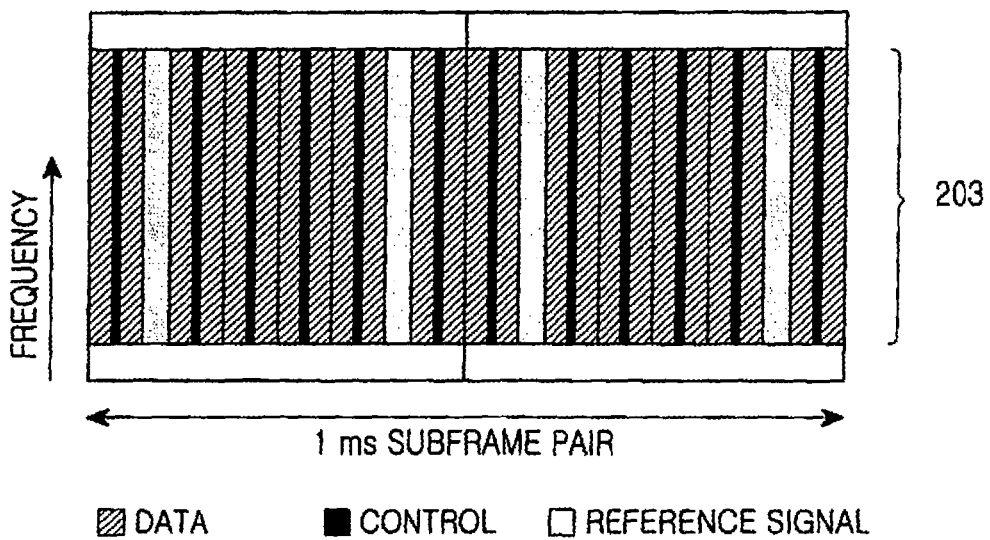
Figure 3:
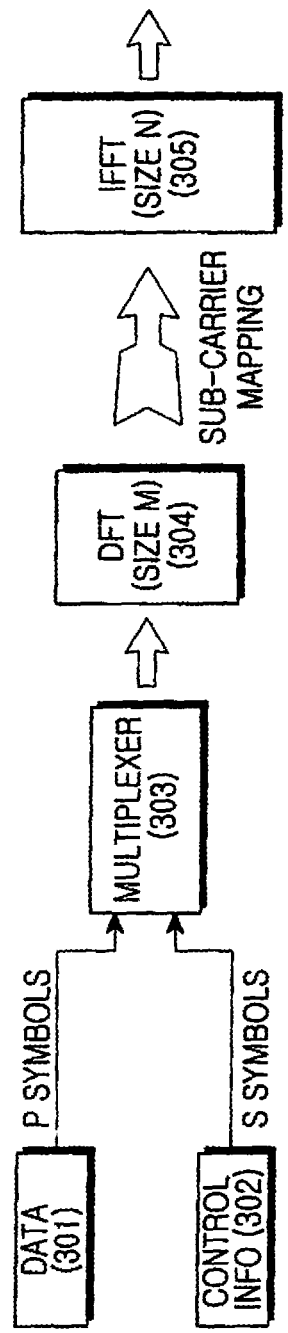
FIG. 3 is a block diagram illustrating a structure of a transmitter for multiplexing and transmitting packet data and control information before input of them to a DFT precoder in a typical SC-FDMA system.

Hereinafter, exemplary embodiments of the present disclosure will be described with reference to the accompanying drawings. In the following description, a detailed description of known functions and configurations incorporated herein will be omitted when it may make the subject matter of the present disclosure rather unclear.

The present disclosure changes the quantity of resources used by a control channel according to a data rate, in order to achieve efficient use of transmission resources, when data and control information are simultaneously transmitted during one time interval in a wireless communication system. As used herein, one time interval is referred to as a Transmission Time Interval (TTI).

The data rate typically refers to a quantity of information data transmitted during a unit time interval. However, as an extension of the present disclosure concept, the data rate may refer to the size of the quantity of radio resources required by a UE for transmission of the information data. In other words, the data rate in the present disclosure should be understood as referring to a transmit power level or a size of transmission bits transmitted by a UE during a unit time interval, that is, during a transmission time unit. The size of the transmission bits refers to the size of a transport block indicated by a transport format or the number of modulation symbols or the number of physical layer bits in a physical layer. The transmit power level refers to the power transmitted by a UE, which may imply either an absolute transmit power or an additional power level (i.e. power offset) necessary for the transmission of a corresponding quantity of data relative to a reference power level, which is a power level necessary for actual data transmission after compensation of channel difference or path loss difference between UEs. The latter has a meaning equivalent to a Signal to Noise Ratio (SNR) necessary for normal reception of a corresponding quantity of data by a Node B.

The present disclosure provides a method for selecting a Transport Format (TF), hereinafter, also referred to as a control channel format, of a control channel according to a data rate and an apparatus for transmitting/receiving data and control information having a changeable TF during the same time interval. Additionally, the present disclosure provides a method for defining another control channel format based on a data rate, a method for calculation thereof, and a method for transmitting data by using the remaining resources except for the selected control channel resources.

An important characteristic of the present disclosure lies in the determination of a control channel format, such as the number of symbols, the number of bits, or a modulation scheme, of a control channel necessary for the transmission of control information, wherein a preset format or a format set by higher layer signaling is used when the control channel is transmitted alone, and the control channel format is determined based on a transport format or a data rate of a data channel at each TTI when the control channel is transmitted together with data. As used herein, each symbol refers to a modulated complex symbol, which is mapped to one transmission unit, such as one sub-carrier or sub-band.

Embodiments of the present disclosure described below correspond to the cases of using a power level necessary for a data channel, a transport format index indicating the quantity of transmissible data, and an MSC level indicating a modulation scheme and a coding rate of a data channel as a transport format or a data rate of the data channel. However, even when there is no specific mention thereof in the present disclosure, any type of information by which a transport format or a data rate of a data channel can be identified can be used in determining a transport format of a control channel, as apparent to one skilled in the art. Further, although the following description of the present disclosure is based on an uplink of a wireless communication system using an SC-FDMA scheme, it goes without saying that such a specific system configuration does not define the scope of the present disclosure.

First Embodiment

A UE preliminarily sets a plurality of control channel formats according to MCS levels indicating coding rates and modulation schemes of data, and then sets a control channel by selecting a control channel format based on an MCS level of a data channel transmitted at each TTI. As used herein, the MCS level refers to a combination of a coding rate and a modulation scheme (e.g. Quadrature Phase Shift Keying (QPSK) scheme, 16-ary Quadrature Amplitude Modulation (16QAM) scheme) used for data transmission. The higher the MCS level, the higher the data rate. That is, when the control information is multiplexed with the data transmission, the coding of the control information is given by the modulation scheme and the coding rate used for the uplink data channel transmission.

According to the first embodiment of the present disclosure, for convenience of description, a format of a control channel is defined by the number of symbols for the control channel, which is obtained after modulation. According to another embodiment of the present disclosure, a transport format of a control channel may be defined by at least one from among the parameters, such as an MCS level, a physical layer bit number, and a coding rate.

When data is transmitted with a low MCS level, an allowable power level for each modulation symbol is also low. Therefore, a large number of modulation symbols are used for the transmission of control information, so as to obtain an energy level satisfying a reception quality. When data is transmitted with a high MCS level, a UE has a good channel condition and it is possible to assign a high power level for each modulation symbol. Therefore, even by using a small number of modulation symbols for the transmission of control information, it is possible to obtain an energy level satisfying a required reception quality.

Table 1 below shows various examples of control channel format setup, wherein S_ori indicates the number (original symbol number) of symbols for control information when the control information is transmitted alone without data and S indicates the number of symbols for control information when the control information is transmitted together with data. According to another embodiment of the present disclosure, S_ori may have a signaled value or a value predetermined by a designer.

TABLE 1

| MCS level of data channel | Number of symbols of control channel (S) (example 1) | Number of symbols of control channel (S) (example 2) | Number of symbols of control channel (S) (example 3) |
| --- | --- | --- | --- |
| QPSK, 1/3 | 10 | S_ori | S_ori*PSD_control/PSD_1 |
| QPSK, 1/2 | 10 | S_ori | S_ori*PSD_control/PSD_2 |
| QPSK, 2/3 | 10 | S_ori | S_ori*PSD_control/PSD_3 |
| QPSK, 3/4 | 10 | S_ori | S_ori*PSD_control/PSD_4 |
| QPSK, 4/5 | 10 | S_ori | S_ori*PSD_control/PSD_5 |
| 16QAM, 1/3 | 6 | S_add | S_ori*PSD_control/PSD_6 |
| 16QAM, 1/2 | 6 | S_add | S_ori*PSD_control/PSD_7 |
| 16QAM, 2/3 | 6 | S_add | S_ori*PSD_control/PSD_8 |
| 16QAM, 3/4 | 6 | S_add | S_ori*PSD_control/PSD_9 |
| 16QAM, 4/5 | 6 | S_add | S_ori*PSD_control/PSD_10 |

In example 2 of the number of symbols for a control channel, in the case where the control information is transmitted alone (without data), the data and the control information use the same format when the data is transmitted with a low MCS level, and a format (S_add) additionally set for the control information is used when the data is transmitted with a high MCS level. As used herein, S_add has a value less than that of S_ori.

In example 3 of the number of symbols for a control channel, as many symbols as those capable of satisfying the entire energy are required when a data transmission power is used in order to simultaneously transmit the control channel and the data channel. Therefore, the number S of the control channel symbols is determined by scaling the original number S_ori of control channel symbols according to a power ratio, in such a manner that a smaller number S of symbols than the original number S_ori of control channel symbols are used when the data transmission power is set to be greater than the power in the case of transmitting only the control channel, while a greater number S of symbols than the original number S_ori of control channel symbols are used when the data transmission power is set to be less than the power in the case of transmitting only the control channel. Here, the Power Spectrum Density-control (PSD_control) refers to a power level necessary for the transmission of the control channel alone, and PSD_n refers to a power level necessary for transmission according to the $n^{th}$ data channel transport format. The format information indicating the number of control channel symbols may be either pre-defined in a standard or set by higher layer signaling.

Figure 4:
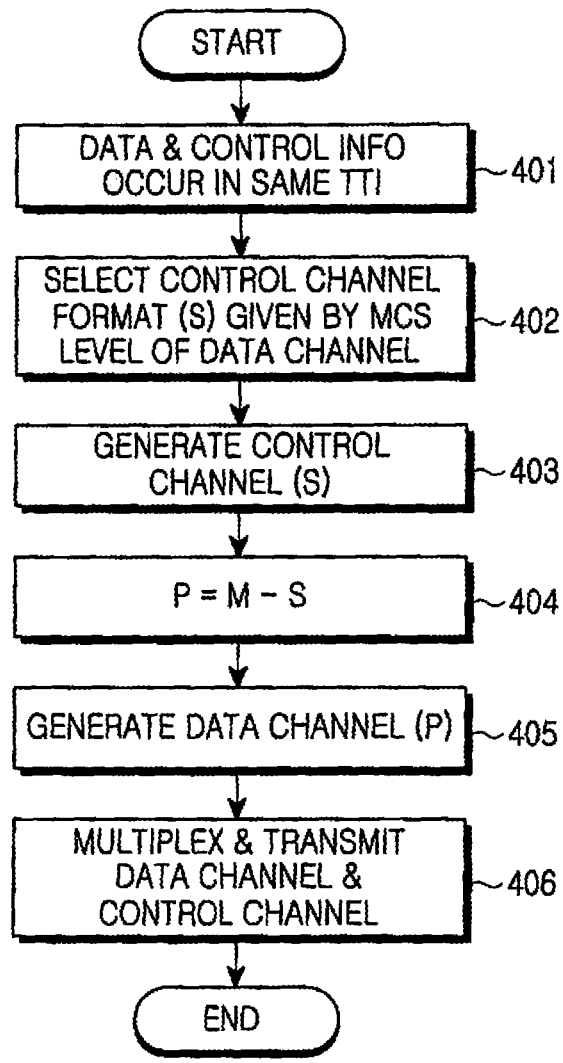
FIG. 4 is a flow diagram illustrating a process of transmitting data and control information by a UE according to a first exemplary embodiment of the present disclosure.

FIG. 4 is a flow diagram illustrating a process of transmitting data and control information by a UE according to a first exemplary embodiment of the present disclosure.

Referring to FIG. 4, when control information and data to be transmitted have occurred in the same TTI in step 401, a UE identifies an MCS level for a data channel and selects a control channel format given by the MCS level in step 402. Then, in step 403, the UE generates control information including an S number of symbols by controlling the repetition times or coding rate of the control information in accordance with the number S of the symbols of the control channel format. When the coding rate is fixed, the UE performs rate matching for the input control information in a manner similar to that for the data, thereby generating control information including an S number of control symbols corresponding to the number S of symbols to be actually transmitted.

In step 404, the UE calculates the number P of symbols for the data channel. Here, the number P of symbols for the data channel is obtained by subtracting the number of control channel symbols from the number M of all symbols according to the scheduled resources (P=M−S). In step 405, data including the P number of symbols is generated. Accordingly, the UE generates the data including the P number of symbols by performing rate matching and modulation in accordance with the number P of symbols for the data channel corresponding to the quantity of the transmissible physical layer. The generated data and control information are multiplexed and transmitted in step 406.

Steps 404 and 405 for the generation of the data and step 403 for the generation of the control information may be executed not only in the illustrated order, but also in a reverse order or simultaneously.

Figure 5:
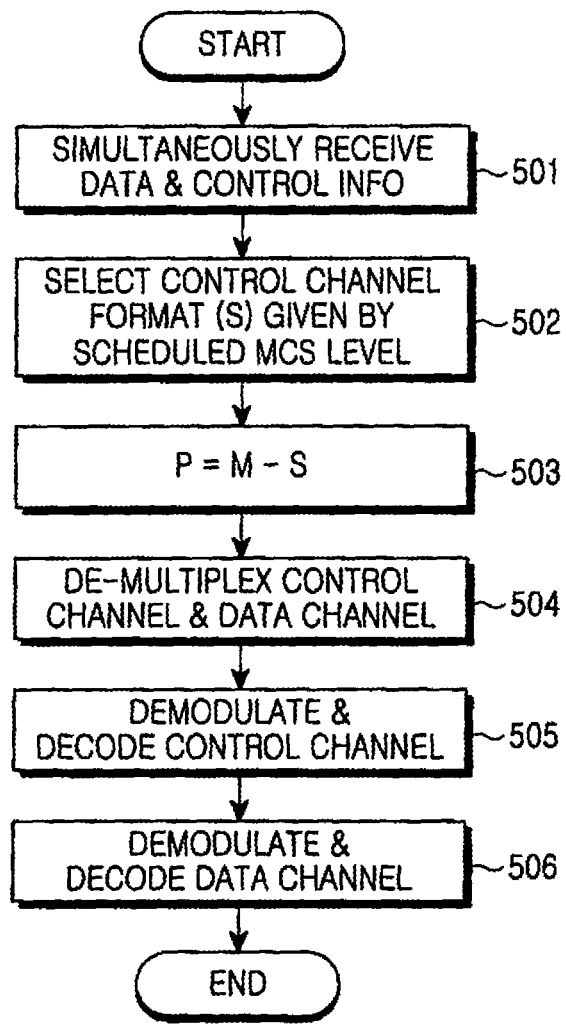
FIG. 5 is a flow diagram illustrating a process of simultaneously receiving data and control information by a Node B according to the first exemplary embodiment of the present disclosure.

FIG. 5 is a flow diagram illustrating a process of simultaneously receiving data and control information by a Node B according to the first exemplary embodiment of the present disclosure.

Referring to FIG. 5, a Node B receives a signal in which control information and data are multiplexed through a predetermined frequency resource in step 501. The CQI is periodically transmitted by the UE, and the ACK/NACK information is transmitted only when downlink data has been received. Therefore, the Node B is exactly aware of a time interval for receiving the signal including the data and the control information. In step 502, the Node B selects a control channel format. Accordingly, the Node B selects a control channel format corresponding to an MCS level determined through scheduling. The Node B notifies the UE of an MCS level of a data channel determined through scheduling information, and the UE transmits data by using the same MCS level as the MCS level scheduled by the Node B. Therefore, control channel formats used by the Node B and the UE are always the same.

In step 503, the Node B obtains the number P of data channel symbols by using the number of symbols of the selected control channel format. In step 504, the Node B de-multiplexes the received signal by using the number of symbols of the control channel and the data channel, thereby dividing the received signal including M symbols into P data channel symbols and S control channel symbols. In steps 505 and 506, the Node B demodulates and decodes the symbols of each channel and then outputs pure data and control information. Here, steps 505 and 506 may be executed not only in the illustrated order but also in a reverse order or simultaneously.

Figure 6:
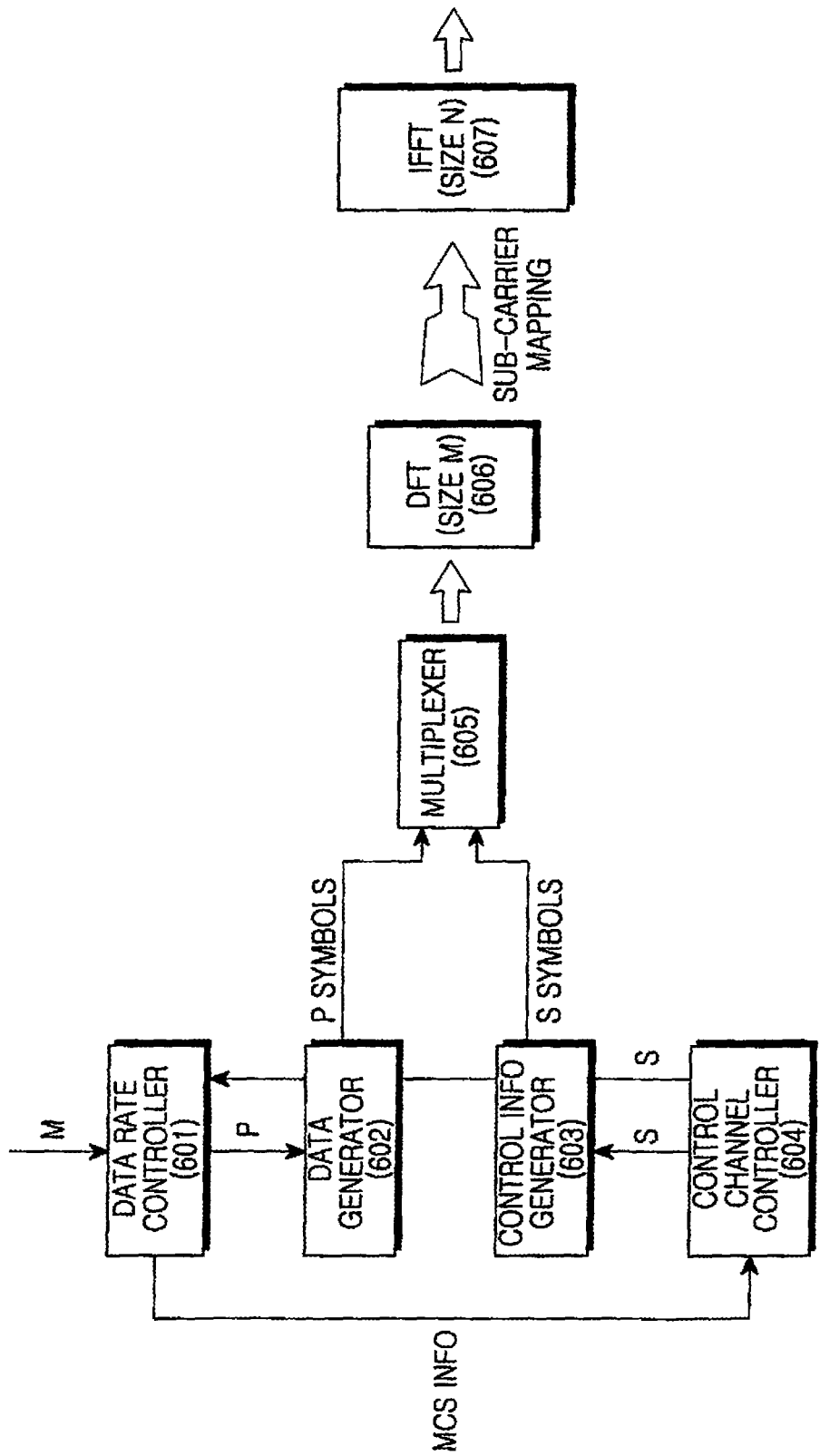
FIG. 6 is a block diagram illustrating a transmitting apparatus of a UE according to the first exemplary embodiment of the present disclosure.

FIG. 6 is a block diagram illustrating a transmitting apparatus of a UE according to the first exemplary embodiment of the present disclosure.

Referring to FIG. 6, a data rate controller 601 receives MCS information scheduled by a Node B through a separate channel (e.g. scheduling channel) from the Node B and then transmits the received MCS information to a control channel controller 604. When control information to be transmitted exists, the control channel controller 604 determines the number S of the symbols of the control information corresponding to the MCS level of the data channel indicated by the MCS information, based on, for example, Table 1 described above. The control information generator 603 receives the number S of the symbols of the control information from the control channel controller 604 and then performs modulation, rate matching, encoding, etc. of the input information bits, thereby generating an S number of control symbols including control information.

If the control channel controller 604 transfers the number S of the symbols of the control information to a data rate controller 601, the data rate controller 601 calculates the number P of the symbols usable for data transmission based on the number S of the symbols of the control information. The data generator 602 generates data including a P number of data symbols, through modulation, rate matching, encoding, etc. of the input information bits, based on the P number of the symbols of the data transferred from the data rate controller 601.

The generated data symbols and control symbols are multiplexed by a multiplexer 605, and a DFT precoder 606 generates a frequency domain signal including SC-FDMA symbols by performing DFT on M symbols, which are output of the multiplexer 605. Then, an IFFT unit 607 maps the frequency domain signal to allocated sub-carriers, thereby convening the frequency domain signal to a time domain signal to be transmitted.

Figure 7:
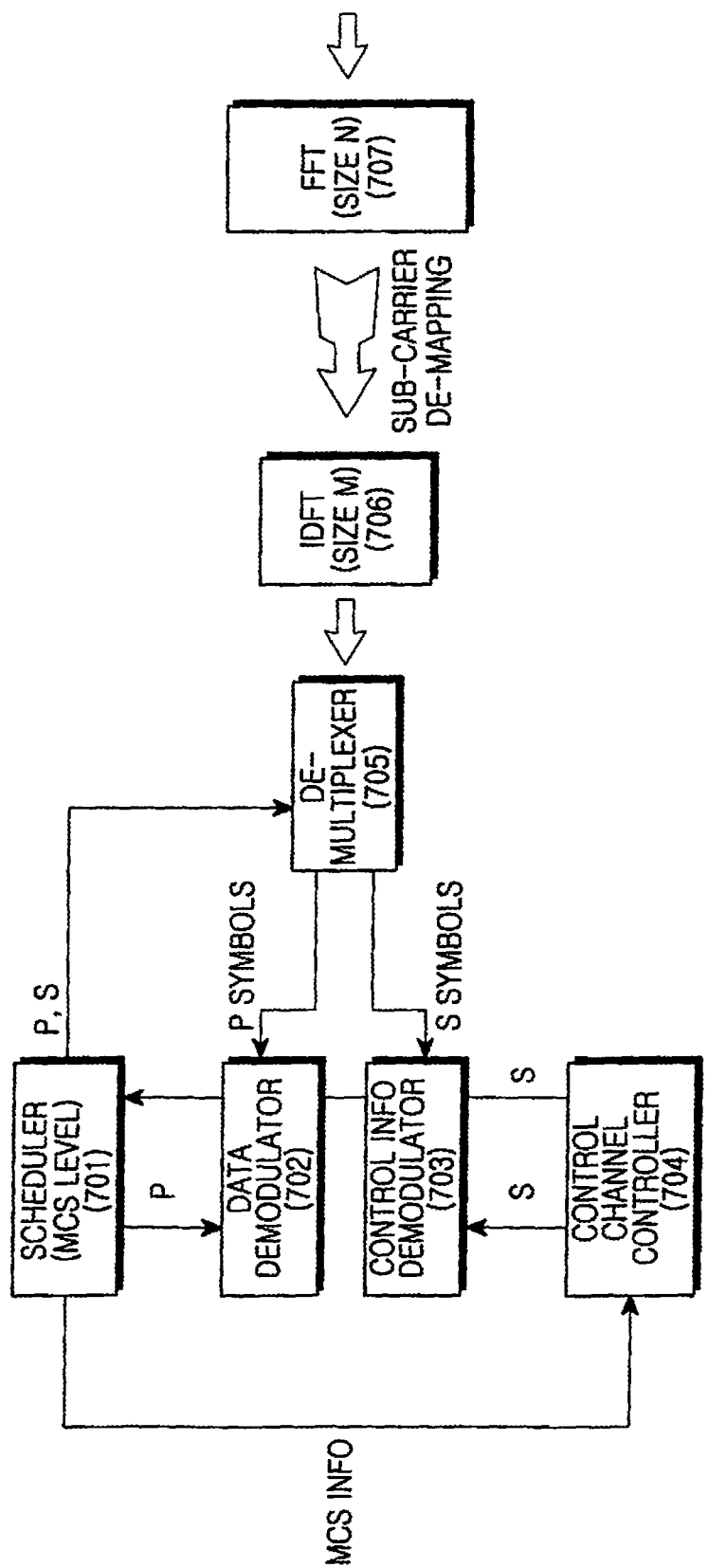
FIG. 7 is a block diagram illustrating a receiving apparatus of a node B according to the first exemplary embodiment of the present disclosure.

FIG. 7 is a block diagram illustrating a receiving apparatus of a node B according to the first exemplary embodiment of the present disclosure.

Referring to FIG. 7, a Node B acquires a signal of a particular UE including an M number of symbols by processing signals received during one TT through an FFT unit

707 and an IDFT unit 706. Then, a de-multiplexer 705 divides the signals of the UE into data signals and control signals. At this time, the number of symbols occupied by each channel is notified from a scheduler 701.

That is, the scheduler 701 determines an MCS level of a data channel and transfers MCS information indicating the MCS level to a control channel controller 704. When there exists control information to be transmitted, the control channel controller 704 determines the number S of symbols used in the control channel of the UE based on the MCS level indicated by the MCS information, and transfers the number S of the control channel symbols to the scheduler 701. The scheduler 701 determines the number P, which is obtained by extracting the number S from the symbol number M corresponding to all of the resources allocated to the UE, as the number of the symbols used for the data transmission, transmits the number P of the data channel symbols to the data demodulator 702, and then notifies the de-multiplexer 705 of the symbol numbers P and S of the data channel and the control channel.

The data demodulator 702 is notified of the symbol number P of the data channel from the scheduler 701, and demodulates and decodes the symbols of the data channel separated by the de-multiplexer 705 according to a demodulation scheme and a coding rate of a corresponding MCS level. To this end, the scheduler 701 provides the number of data channel symbols and information for a detailed operation to the data demodulator 702. The control information demodulator 703 is notified of the number S of control channel symbols from the control channel controller 704, and demodulates and decodes the symbols of the control channel separated by the de-multiplexer 705 according to a corresponding demodulation scheme and coding rate, thereby obtaining control information, such as ACK/NACK or CQI.

Second Embodiment

According to the second embodiment of the present disclosure, a UE transmits a control channel after modulating the control channel according to the same modulation scheme as that of the data channel, in order to achieve efficient use of resources. According to the prior art, because it is difficult to frequently change the control channel format according to the channel situation of a UE, the UE uses a fixed low format for the control channel in order to secure the reliability. However, since the data channel is instantaneously scheduled based on the channel status information of the UE, the Node B can variably set a high data rate or a low data rate for the data channel according to the channel state of the UE. When a Node B allocates a high data rate to the data channel, it can be determined that a corresponding UE is in a good channel condition or has sufficient transmission power. Therefore, it is also possible to transmit the control channel with a high transmission power. Therefore, according to the second embodiment of the present disclosure, the control information is modulated according to the same modulation scheme as that of the data, and the number of symbols for the control information is controlled in accordance with the modulation.

For preferable implementation of the second embodiment of the present disclosure, the modulation scheme of each data channel and the modulation scheme of each control channel are defined as in Table 2 below. Then, the number of symbols necessary for the control channel is determined according to a corresponding modulation scheme.

TABLE 2

| Data channel modulation scheme | Control channel modulation scheme |
|---|---|
| QPSK | QPSK |
| 16QAM | 16QAM |

Figure 8:
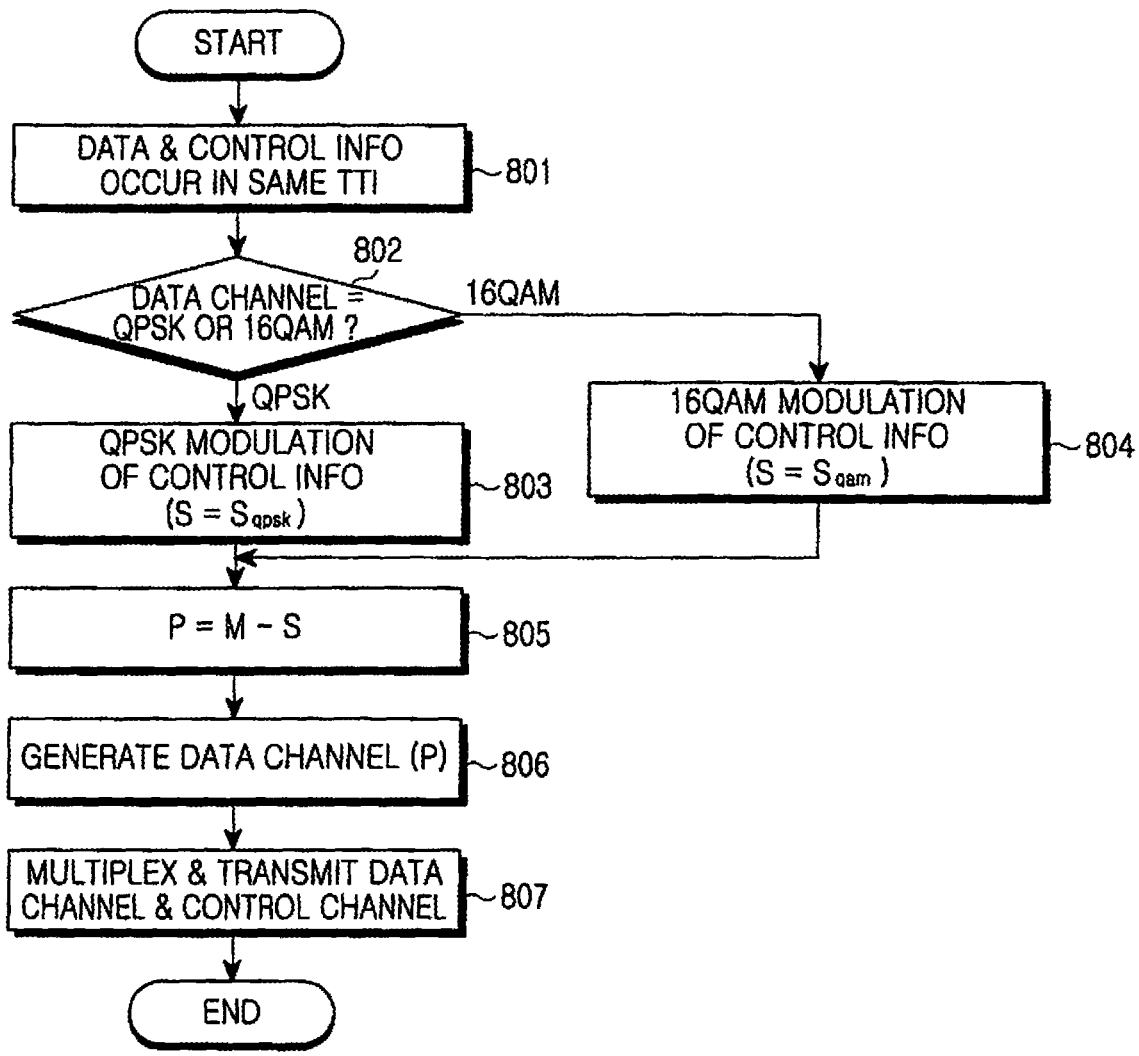
FIG. 8 is a flow diagram illustrating a process of transmitting data and control information by a UE according to a second exemplary embodiment of the present disclosure.

FIG. 8 is a flow diagram illustrating a process of transmitting data and control information by a UE according to a second exemplary embodiment of the present disclosure.

Referring to FIG. 8, when control information and data to be transmitted have occurred in the same TTI in step 801, a UE identifies a modulation scheme indicated by an MCS level of a data channel in step 802. The following description is given in the case where two schemes, including a QPSK scheme and a 16QAM scheme, are used as modulation schemes for the data channel. However, it goes without saying that the present disclosure can be applied to another case where another modulation scheme is used.

When the modulation scheme of the data channel is the QPSK scheme, the UE proceeds to step 803, in which the UE modulates the control information according to the QPSK scheme and selects the symbol number $S_{qpsk}$ corresponding to the QPSK scheme as the number S of symbols necessary for transmission of the control channel. In contrast, when the modulation scheme of the data channel is the 16QAM scheme, the UE proceeds to step 804, in which the UE modulates the control information according to the 16QAM scheme and selects the symbol number Sm corresponding to the 16QAM scheme as the number S of symbols necessary for transmission of the control channel. The number of control information bits before channel encoding is already known, and is usually twice as many bits as the number of bits of the QPSK scheme can be transmitted in the case of the 16QAM scheme. Therefore, in the case of using the 16QAM scheme, the number $S_{qam}$ of symbols necessary for the transmission of control information is reduced to one-half of the number $S_{qpsk}$ of symbols in the case of the QPSK scheme.

In step 805, the UE calculates the number P of symbols for the data channel, in order to generate the data channel. The number P of symbols for the data channel corresponds to a value obtained by subtracting the number S of control channel symbols from the number M of all symbols according to the scheduled resources (P=M−S). The UE generates the data including the P number of symbols through rate matching in step 806, and then multiplexes and transmits the generated data and control information in step 807. Steps 805 and 806 for the generation of the data and step 803 or 804 for the generation of the control information may be executed not only in the illustrated order, but also in a reverse order or simultaneously.

Figure 9:
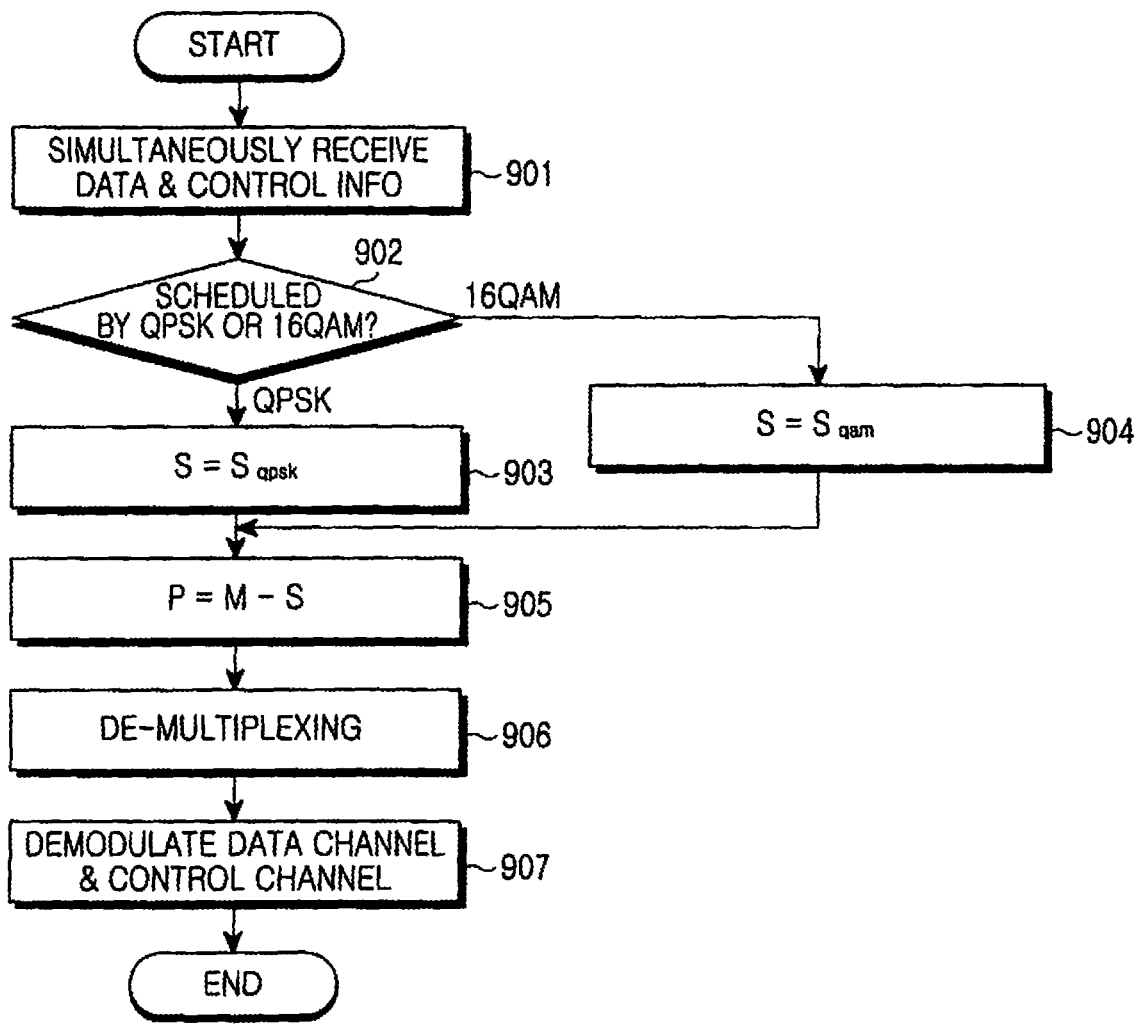
FIG. 9 is a flow diagram illustrating a process of simultaneously receiving data and control information by a Node B according to the second exemplary embodiment of the present disclosure.

FIG. 9 is a flow diagram illustrating a process of simultaneously receiving data and control information by a Node B according to the second exemplary embodiment of the present disclosure.

Referring to FIG. 9, a Node B receives a signal in which control information and data are multiplexed through a predetermined frequency resource in step 901. In step 902, the Node B determines the number of control channel symbols based on the modulation format of the data channel scheduled for the UE. When the scheduled modulation format is the QPSK, the Node B selects the number $S_{qpsk}$ of QPSK symbols as the number S of the control channel symbols in step 903. In contrast, when the scheduled modulation format is the 16QAM, the Node B selects the number $S_{qam}$ of 16QAM symbols as the number S of the control channel symbols in step 904.

In step 905, the Node B calculates the number P of the data channel symbols based on the number S of the control channel symbols. In step 906, the Node B de-multiplexes the received signal including M symbols based on the number of the control channel symbols and the data channel symbols, thereby dividing the received signal into P data channel symbols and S control channel symbols. In steps 907, the Node B demodulates and decodes the symbols of each channel and then outputs pure data and control information.

The second embodiment of the present disclosure may be implemented by using the transmission/reception apparatus of the first embodiment of the present disclosure as shown in FIGS. 6 and 7.

Third Embodiment

According to the third embodiment of the present disclosure the number of symbols for transmitting control information is controlled by transmitting the control information according to the same modulation scheme as that of the data. In this embodiment of the present disclosure, the data and the control information is multiplexed at the bit level before the modulation instead of at the symbol level after the modulation. When the multiplexing is performed before the modulation, the UE or the Node B need not separately select a modulation scheme of a control channel according to the modulation scheme of the data channel. Therefore, the process of the transmission/reception according to the third embodiment of the present disclosure is the same as that of the second embodiment of the present disclosure as shown in FIGS. 8 and 9.

Figure 10:
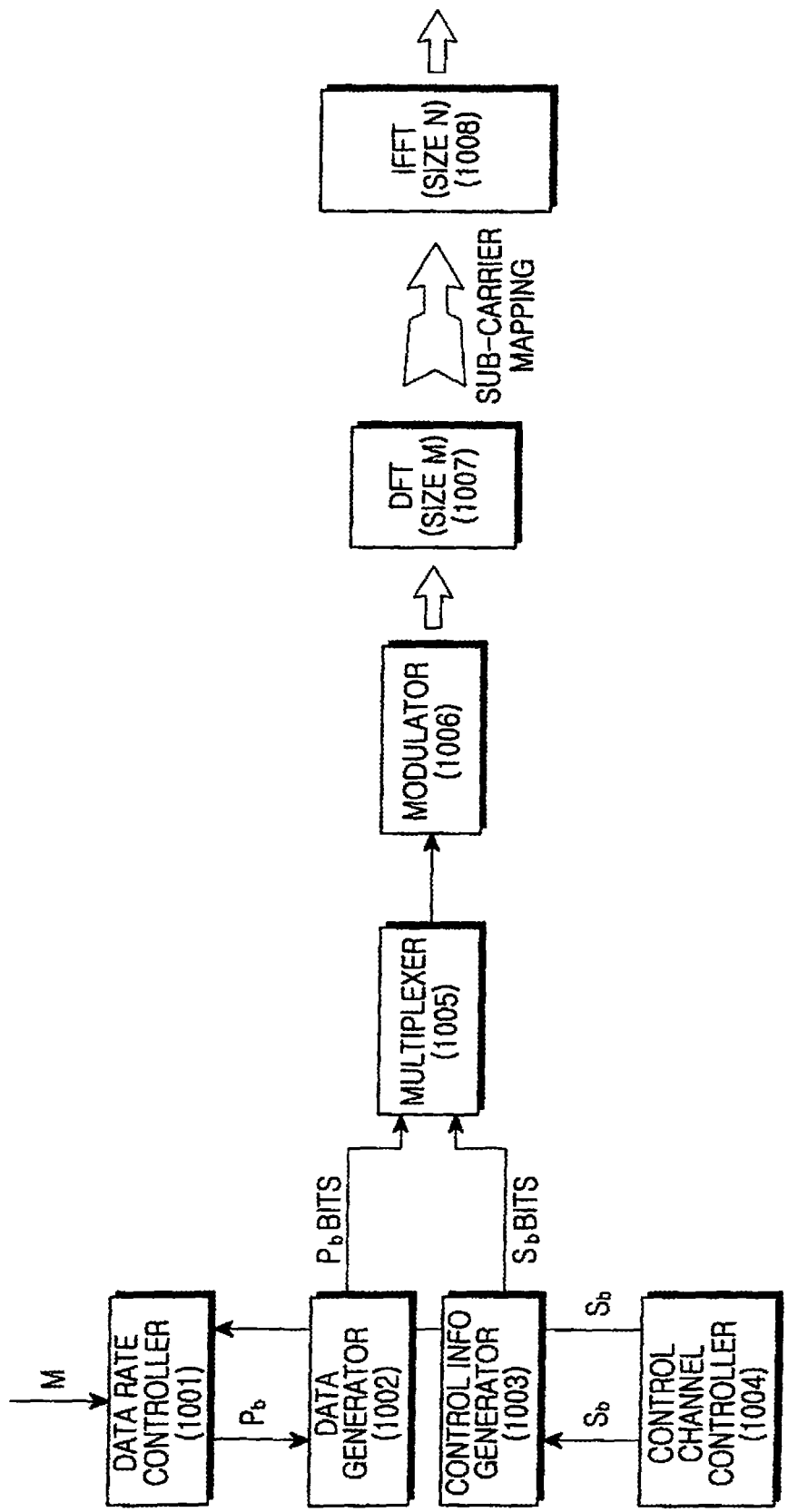
FIG. 10 is a block diagram illustrating a transmitting apparatus of a UE according to the third exemplary embodiment of the present disclosure.

FIG. 10 is a block diagram illustrating a transmitting apparatus of a UE according to the third exemplary embodiment of the present disclosure.

Referring to FIG. 10, when data and control information are to be simultaneously transmitted, since data resources for the transmission of the data are changeable, a data rate controller 1001 is notified of the quantity of resources for the transmission of the control information through a control channel controller 1004. The data and the control information am multiplexed before the modulation differently from the second embodiment of the present disclosure, the quantity of resources occupied by each channel is calculated by the bit number. The data rate controller 1001 receives the number $S_b$ of control information bits from the control channel controller 1004, and calculates the number $P_b$ of bits usable for transmission of the data based on all the transmissible bits. The data generator 1002 generates a $P_b$ number of data bits in accordance with the calculated number $P_b$ of the data channel bits by encoding the pure data to be transmitted, and then provides the generated data bits to a multiplexer 1005.

A control information generator 1003 generates an $S_b$ number of control information bits in accordance with the number $S_b$ of the control information bits calculated by the control channel controller 1004 by encoding the pure control information to be transmitted, and then provides the generated control information bits to the multiplexer 1005. The multiplexer 1005 multiplexes the generated data symbols and control symbols. The multiplexed bits are modulated according to the same modulation scheme by a modulator 1006, are processed by a DFT precoder 1007 and an IFFT unit 1008, and are then transmitted.

Figure 11:
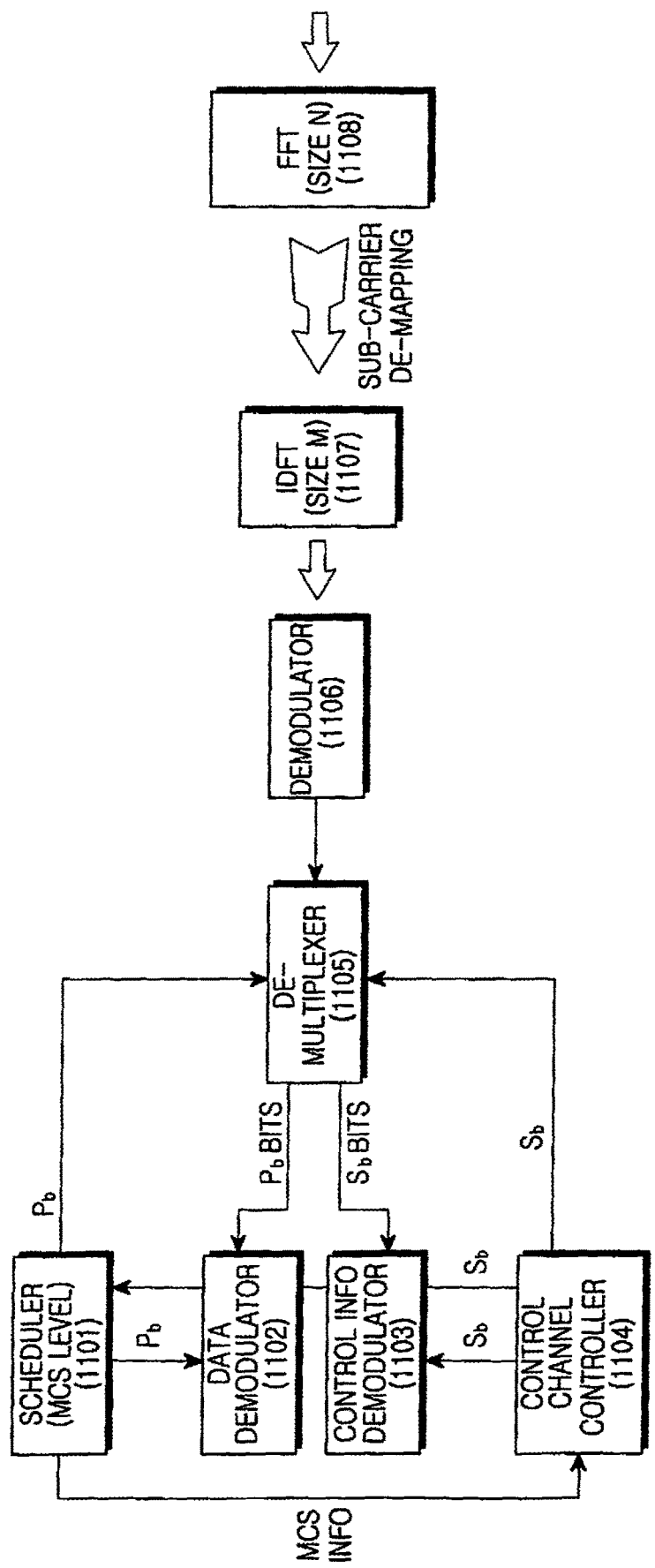
FIG. 11 is a block diagram illustrating a receiving apparatus of a node B according to the third exemplary embodiment of the present disclosure.

FIG. 11 is a block diagram illustrating a receiving apparatus of a node B according to the third exemplary embodiment of the present disclosure.

Referring to FIG. 11, a Node B acquires a signal of a particular UE including an M number of symbols by processing a signal received during one TTI through an FFT unit 1108 and an IDFT unit 1107. These symbols are demodulated according to a demodulation scheme corresponding to the same modulation scheme by a demodulator 1106, and are then input in a form of bit stream to a de-multiplexer 1105.

A scheduler 1101 determines an MCS level of a data channel and transfers MCS information indicating the MCS level to a control channel controller 1104. When there exists control information to be transmitted, the control channel controller 1104 determines the number $S_b$ of the symbols used in the control channel of the UE based on the MCS level indicated by the MCS information, and transfers the number $S_b$ of the control channel symbols to the scheduler 1101. The scheduler 1101 determines the number $P_b$, which is obtained by extracting the number $S_b$ from the number of all bits transmissible by the UE, as the number of the bits used for the data transmission, and transmits the number $P_b$ of the data channel bits to the data demodulator 1102 and the de-multiplexer 1105.

The de-multiplexer 1105 receives the number $P_b$ and $S_b$ of each channel from the scheduler 1101 and the control channel controller 1104, divides bits of each channel from the bit stream, and then transfers the separated bits to the data demodulator 1102 and the control information demodulator 1103. The demodulators 1102 and 1103 demodulate and decode the input bits under the control of the scheduler 1101 and the control information controller 1104, thereby obtaining pure data and control information.

Fourth Embodiment

A UE initially sets a plurality of control channel formats according to Transport Formats (TFs) of data, and then sets a control channel by selecting a control channel format corresponding to a TF of data transmitted at each TTI. The TF according to the fourth embodiment of the present disclosure refers to a Transport Block Size (TBS) corresponding to the quantity of data to be transmitted by a UE, and is determined by the MCS level and the quantity of all usable frequency resources. Further, for convenience of description, the control channel format is defined by the number of control channel symbols in the present embodiment. Although not specifically described here, parameters, such as an MCS level or the number of physical layer bits, may be defined as the control channel transport format according to a modified embodiment of the present invention.

When a low TF is used, an allowable power level for each modulation symbol is also low. Therefore, a large number of modulation symbols are used for the transmission of control information, so as to obtain an energy level satisfying a required reception quality. When data is transmitted with a high MCS level, a UE has a good channel condition, and it is possible to assign a high power level for each modulation symbol. Therefore, even by using a small number of modulation symbols for the transmission of control information, it is possible to obtain an energy level satisfying a required reception quality.

Table 3 below shows various examples of control channel format setup.

TABLE 3

| TF index of data channel (k) | Number of symbols of control channel (S) (example 1) | Number of symbols of control channel (S) (example 2) |
| --- | --- | --- |
| 1 | S1 | S_ref*PSD_ref/PSD_1 |
| 2 | S2 | S_ref*PSD_ref/PSD_2 |
| 3 | S3 | S_ref*PSD_ref/PSD_3 |
| 4 | S4 | S_ref*PSD_ref/PSD_4 |
| 5 | S5 | S_ref*PSD_ref/PSD_5 |
| 6 | S6 | S_ref*PSD_ref/PSD_6 |
| 7 | S7 | S_ref*PSD_ref/PSD_7 |
| 8 | S8 | S_ref*PSD_ref/PSD_8 |
| 9 | S9 | S_ref*PSD_ref/PSD_9 |
| 10 | S10 | S_ref*PSD_ref/PSD_10 |

In example 1, the number of control channel symbols is defined for each TF. In example 2, a reference number S_ref of the control channel symbols is defined in advance, and the number S of symbols necessary for the control channel is calculated through comparison between a power level PSD_k (wherein k denotes a TF index) necessary for the transmission of data for each TF and a power level of data when the reference number of symbols are used. When the power level of data in Table 3 is high, the power level usable for the control channel is also high. Therefore, it is possible to transmit control information by using a small number of symbols.

Figure 12:
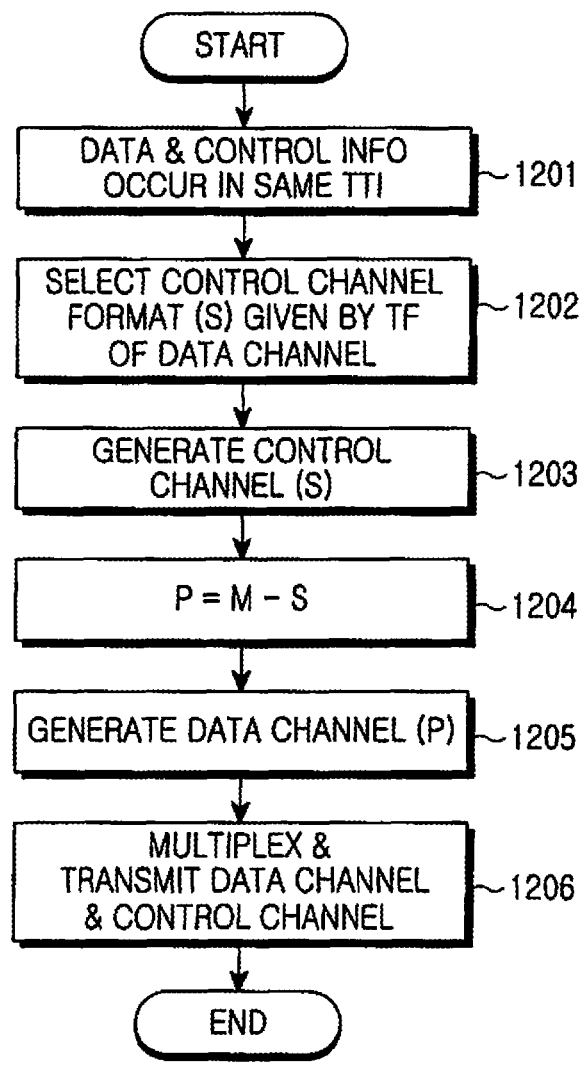
FIG. 12 is a flow diagram illustrating a process of transmitting data and control information by a UE according to the fourth exemplary embodiment of the present disclosure.

FIG. 12 is a flow diagram illustrating a process of transmitting data and control information by a UE according to the fourth exemplary embodiment of the present disclosure.

Referring to FIG. 12, when control information and data to be transmitted have occurred in the same TTI in step 1201, a UE identifies a TF index for a data channel and selects a control channel format given by the TF index in step 1202. In step 1203, the UE generates control information including an S number of symbols by controlling the repetition times or coding rate of the control information in accordance with the number S of the symbols of the control channel format. When the coding rate is fixed, the UE performs rate matching for the input control information in a manner similar to that for the data, thereby generating control information including an S number of control symbols corresponding to the number S of symbols to be actually transmitted.

In step 1204, the UE calculates the number P of symbols for the data channel. The number P of symbols for the data channel is obtained by subtracting the number of control channel symbols from the number M of all symbols according to the scheduled resources (P=M−S). In step 1205, data including the P number of symbols is generated. Accordingly, the UE generates the data including P symbols by performing rate matching and modulation in accordance with the number P of the data channel symbols corresponding to the quantity of transmissible physical layer. The generated data and control information are multiplexed and transmitted in step 1206.

Figure 13:
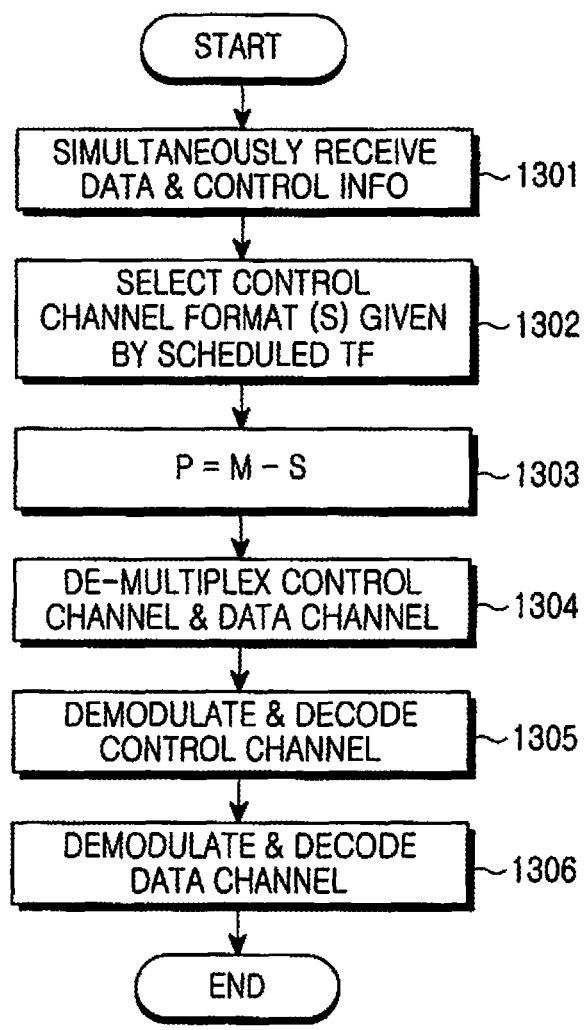
FIG. 13 is a flow diagram illustrating a process of simultaneously receiving data and control information by a Node B according to the fourth exemplary embodiment of the present disclosure.

FIG. 13 is a flow diagram illustrating a process of simultaneously receiving data and control information by a Node B according to the fourth exemplary embodiment of the present disclosure.

Referring to FIG. 13, a Node B receives a signal in which control information and data are multiplexed through a predetermined frequency resource in step 1301L The CQI is periodically transmitted by the UE, and the ACK/NACK information is transmitted only when downlink data has been received. Therefore, the Node B is exactly aware of a time interval for receiving the signal including the data and the control information. In step 1302, the Node B selects a control channel format. Accordingly, the Node B selects a control channel format corresponding to a TF index determined through scheduling. The Node B notifies the UE of a TF index of a data channel determined through scheduling information, and the UE transmits data by using the same TF index as the TF index scheduled by the Node B. Therefore, control channel formats used by the Node B and the UE are always the same.

In step 1303, the Node B obtains the number P of data channel symbols by using the number of symbols of the selected control channel format. In step 1304, the Node B de-multiplexes the received signal by using the number of symbols of the control channel and the data channel, thereby dividing the received signal including M symbols into P data channel symbols and S control channel symbols. In steps 1305 and 1306, the Node B demodulates and decodes the symbols of each channel and then outputs pure data and control information.

Figure 14:
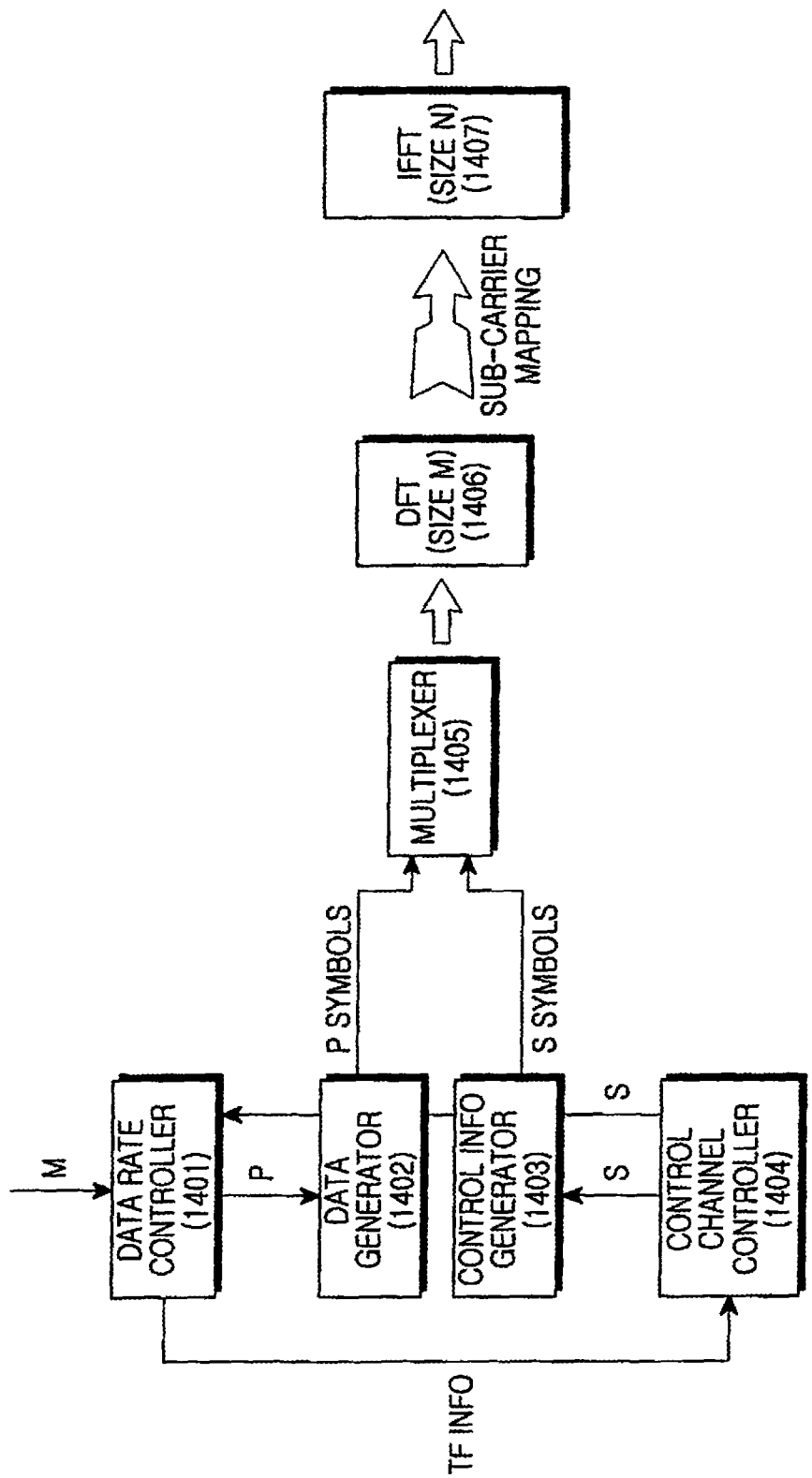
FIG. 14 is a block diagram illustrating a transmitting apparatus of a UE according to the fourth exemplary embodiment of the present disclosure.

FIG. 14 is a block diagram illustrating a transmitting apparatus of a UE according to the fourth exemplary embodiment of the present disclosure.

Referring to FIG. 14, a data rate controller 1401 receives TF information scheduled by a Node B through a separate channel (e.g. scheduling channel) from the Node B and then transmits the received TF information to a control channel controller 1404. When control information to be transmitted exists, the control channel controller 1404 determines the number S of the symbols of the control information corresponding to the TF index of the data channel indicated by the TF information, based on, for example, Table 3 described above. The control information generator 1403 receives the number S of the symbols of the control information from the control channel controller 1404 and then generates an S number of control symbols including control information.

If the control channel controller 1404 transfers the number S of the symbols of the control information to a data rate controller 1401, the data rate controller 1401 calculates the number P of the symbols usable for data transmission based on the number S of the symbols of the control information. The data generator 1402 generates, through modulation, rate matching, encoding, etc. of the input information bits, data including the P number of data symbols transferred from the data rate controller 1401.

The generated data symbols and control symbols are multiplexed by a multiplexer 1405, and a DFT precoder 1406 generates a frequency domain signal including SC-FDMA symbols by performing DFT on M symbols, which are output of the multiplexer 1405. Then, an IFFT unit 1407 maps the frequency domain signal to allocated sub-carriers, thereby converting the frequency domain signal to a time domain signal to be transmitted.

Figure 15:
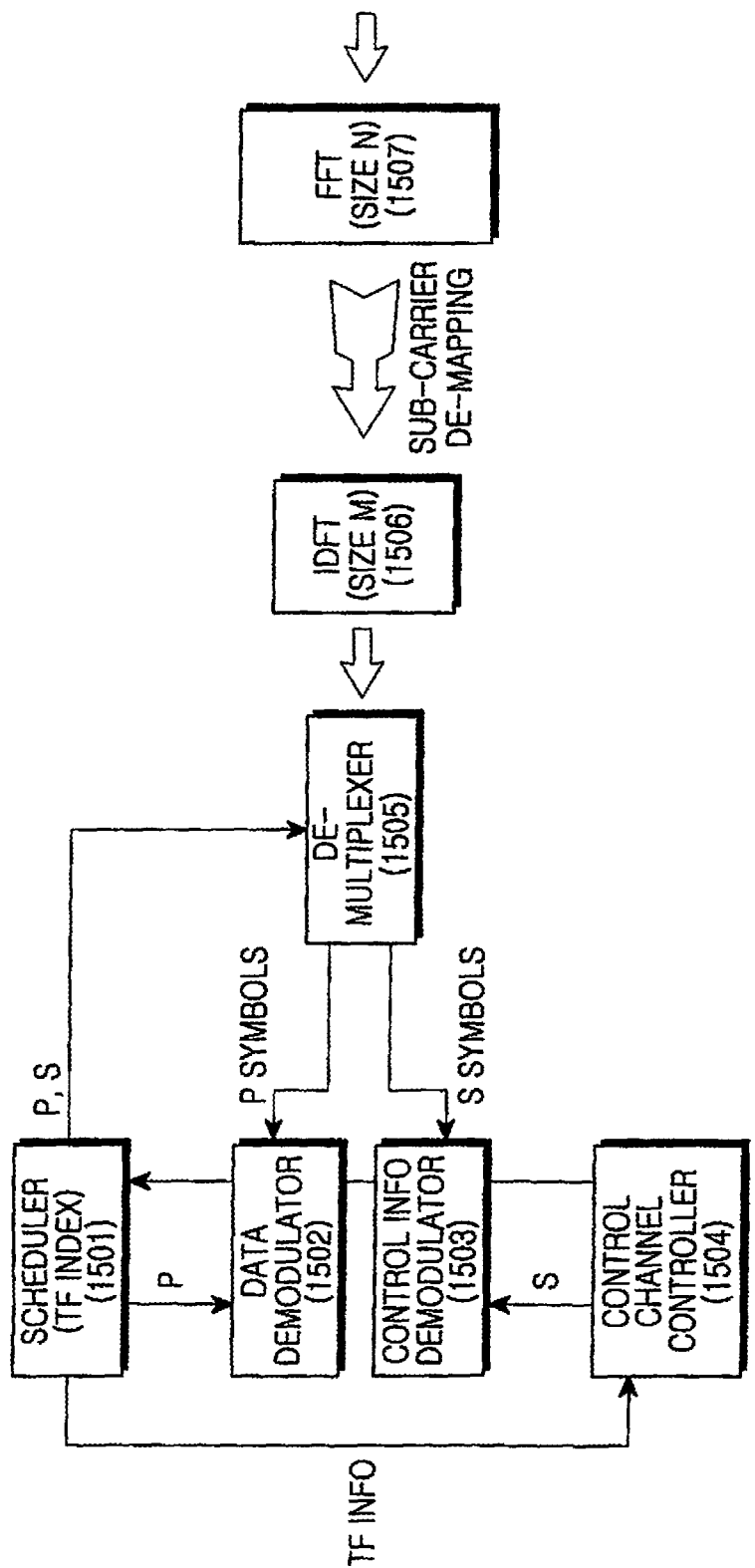
FIG. 15 is a block diagram illustrating a receiving apparatus of a node B according to the fourth exemplary embodiment of the present disclosure.

FIG. 15 is a block diagram illustrating a receiving apparatus of a node B according to the fourth exemplary embodiment of the present disclosure.

Referring to FIG. 15, a Node B acquires a signal of a particular UE including an M number of symbols by processing a signal received during one TTI through an FFT unit 1507 and an IDFT unit 1506. Then, a de-multiplexer 1505 divides the signal of the UE into data and control signal. At this time, the number of symbols occupied by each channel is notified from a scheduler 1501. The scheduler

1501 determines an MCS level of a data channel and transfers a TF index corresponding to the determined MCS level to a control channel controller 1504. When there exists control information to be transmitted, the control channel controller 1504 determines the number S of symbols used in the control channel of the UE based on the TF index scheduled to the UE, and transfers the number S of the control channel symbols to the scheduler 1501. The scheduler 1501 determines the number P, which is obtained by extracting the number S from the symbol number M corresponding to all of the resources allocated to the UE, as the number of the symbols used for the data transmission, transmits the number P of the data channel symbols to the data demodulator 1502, and then notifies the de-multiplexer 1505 of the symbol numbers P and S of the data channel and the control channel.

The data demodulator 1502 is notified of the symbol number P of the data channel from the scheduler 1501, and demodulates and decodes the symbols of the data channel separated by the de-multiplexer 1505 according to a demodulation scheme and a coding rate of a corresponding TF index. To this end, the scheduler 1501 provides the number of data channel symbols and information for a detailed operation to the data demodulator 1502. The control information demodulator 1503 is notified of the number S of control channel symbols from the control channel controller 1504, and demodulates and decodes the symbols of the control channel separated by the de-multiplexer 1505 according to a corresponding demodulation scheme and coding rate, thereby obtaining control information, such as ACK/NACK or CQI.

Fifth Embodiment

The fifth embodiment of the present disclosure is similar to the fourth embodiment of the present disclosure, excepting that the control channel format is determined based on a power level necessary for data transmission, instead of being determined for each TF. Further, according to the present embodiment of the present disclosure, necessary power level refers to an absolute transmission power of a UE or a power offset additionally set to the reference power level in consideration of the service and each TF relative to the reference power level. The reference transmission power refers to a power level controlled by a Node B in order to maintain a predetermined reception level. The additionally set power relative to the reference power level has the same meaning as that of an SNR necessary for reception of corresponding data by a Node B.

In general, in the case of data transmission of the same service, the greater the TF index of a data channel (i.e. the greater the data rate), the greater the power level necessary for data transmission. The power level necessary for the data transmission may imply either a symbol power for each sub-carrier in a frequency domain or a power level for each modulation symbol in a time domain. For convenience of description, a control channel format is defined by the number of symbols for a control channel in the present embodiment. Although not described in detail here, parameters, such as an MCS level or the number of physical layer bits, may be defined as the control channel transport format according to a modified embodiment of the present invention.

Table 4 below shows various examples of control channel format setup.

TABLE 4

| PSD of data channel | Number of symbols of control channel (S) (example 1) | Number of symbols of control channel (S) (example 2) |
| --- | --- | --- |
| PSD1 | S1 | S_ref*PSD_ref/PSD_1 |
| PSD2 | S2 | S_ref*PSD_ref/PSD_2 |
| PSD3 | S3 | S_ref*PSD_ref/PSD_3 |
| PSD4 | S4 | S_ref*PSD_ref/PSD_4 |
| PSD5 | S5 | S_ref*PSD_ref/PSD_5 |
| PSD6 | S6 | S_ref*PSD_ref/PSD_6 |
| PSD7 | S7 | S_ref*PSD_ref/PSD_7 |
| PSD8 | S8 | S_ref*PSD_ref/PSD_8 |
| PSD9 | S9 | S_ref*PSD_ref/PSD_9 |
| PSD10 | S10 | S_ref*PSD_ref/PSD_10 |

In example 1, the number of control channel symbols is defined for each PSD indicating the power level of the data channel. When the power level of the control channel is greater than or less than the power level of the data channel, there is inefficiency in use of the transmission power by a UE. Therefore, when a data channel and a control channel are simultaneously transmitted, it is preferred that the power level of the control channel is set to be the same as that of the data channel. In this case, in order to secure the reliability of the control channel, it is possible to increase the number of the control channel symbols and thus repeat the control information symbols more times, as the power level of the data channel decreases. Otherwise, when the power level of the data channel is high, it is possible to reduce the number of transmitted control information symbols, so as to minimize the puncturing loss that may occur in the data part for the transmission of control information. Table 4 shows a method of setting a control channel format in order to calculate the number of symbols necessary for the stable reception of control information, when the power level of the control information is set to be the same as that of the data channel.

In example 2, a reference number S_ref of the control channel symbols is defined in advance, and the number of symbols necessary for the control channel is calculated through a comparison between a power level PSD_k (wherein k denotes a PSD index of the data channel) necessary for transmission of data for each PSD and a power level of the data channel when the reference number of symbols are used. As noted from Table 4, when the power level of the data channel is high, the power level usable for the control channel is also high. Therefore, it is possible to transmit control information by using a small number of symbols. When the power level of the data channel is low, it is possible to transmit more symbols. Therefore, it is possible to maintain the required reliability of the control channel with a low PSD.

A process and an apparatus of a UE and a Node B according to the fifth embodiment of the present disclosure are the same as those of the fourth embodiment of the present disclosure, excepting that a PSD of a data channel instead of the TF information serves as a reference for selection of a transport format of a control channel.

The present disclosure as described above has the following effects.

In a wireless communication system using a single carrier frequency division multiple access scheme according to the present disclosure, control information and data for uplink transmission are multiplexed to satisfy the single carrier characteristic, thereby reducing the PAPR.

While the invention has been shown and described with reference to certain exemplary embodiments of the present disclosure thereof, it will be understood by those skilled in the art that various changes in form and details may be made therein without departing from the spirit and scope of the present disclosure as defined by the appended claims.

What is claimed is:

1. A method for transmitting data and control information performed by a user equipment, the method comprising:
  receiving, from a base station, a modulation and coding scheme (MCS) level indicating a modulation scheme;
  matching the received MCS level to a size of a transport block for the data selected from a plurality of different sizes of the transport block for the data;
  determining a quantity S of symbols for control information based on the size of the transport block for the data;
  determining a quantity P of symbols for the data by subtracting the quantity S of symbols for the control information from a quantity M of symbols for the data and the control information;
  modulating the control information and the data by the modulation scheme; and
  transmitting the modulated control information and the data on a channel.

2. The method of claim 1, wherein the control information comprises acknowledge/non-acknowledge (ACK/NACK) information or a channel quality indicator (CQI).

3. The method of claim 1, further comprising: performing fast Fourier transform (FFT) and performing inverse FFT (IFFT) to the modulated control information and data.

4. An apparatus for transmitting data and control information, the apparatus comprising:
  a controller configured to
    receive a modulation and coding scheme (MCS) level indicating a modulation scheme;
    matching the received MCS level to a size of a transport block for the data selected from a plurality of different sizes of the transport block for the data;
    determine a quantity S of symbols for control information based on the size of the transport block for the data;
    determine a quantity P of symbols for data by subtracting the quantity S of symbols for the control information from a quantity M of symbols for the data and the control information; and
    modulate the control information and the data by the modulation scheme; and
  a transmitter configured to transmit the modulated control information and the data on a channel.

5. The apparatus of claim 4, the control information comprises acknowledge/non-acknowledge (ACK/NACK) information or a channel quality indicator (CQI).

6. The apparatus of claim 5, wherein the controller is further configured to perform fast Fourier transform (FFT) and perform inverse FFT (IFFT) to the modulated control information and data.

7. A method for receiving data and control information, the method comprising:
  sending, by a network device, a modulation and coding scheme (MCS) level indicating a modulation scheme;
  receiving, by the network device, control information and data on a channel;
  matching, by the network device, the MCS level to a size of a transport block for the data selected from a plurality of different sizes of the transport block for the data;
  determining, by the network device, a quantity S of symbols for control information based on the size of the transport block for the data;
  determining, by the network device, a quantity P of symbols for data by subtracting the quantity of symbols S for the control information from a quantity M of symbols for the data and the control information; and
  demodulating, by the network device, the control information and the data by the modulation scheme.

8. The method of claim 7, wherein the control information comprises acknowledge/non-acknowledge (ACK/NACK) information or a channel quality indicator (CQI).

9. The method of claim 7, further comprising: performing fast Fourier transform (FFT) and performing inverse FFT (IFFT) to the received control information and data.

10. An apparatus for receiving data and control information, the apparatus comprising:
  a controller configured to send a modulation and coding scheme (MCS) level indicating a modulation scheme;
  a receiver configured to receive control information and data on a channel; and
  the controller further configured to
    match the MCS level to a size of a transport block for the data selected from a plurality of different sizes of the transport block for the data;
    determine a quantity S of symbols for control information based on the size of the transport block for the data;
    determine a quantity P of symbols for data by subtracting the quantity S of symbols for the control information from a quantity M of symbols for the data and the control information; and
    demodulate the control information and the data by the modulation scheme.

11. The apparatus of claim 10, wherein the control information comprises acknowledge/non-acknowledge (ACK/NACK) information or a channel quality indicator (CQI).

12. The apparatus of claim 10, wherein the controller is further configured to perform fast Fourier transform (FFT) and performing inverse FFT (IFFT) to the received control information and data.

* * * * *